United States Patent [19]

Clark

[11] Patent Number: 5,219,046
[45] Date of Patent: Jun. 15, 1993

[54] AIRCRAFT BRAKE

[75] Inventor: Gary L. Clark, Maplewood, Ohio

[73] Assignee: The B. F. Goodrich Company, Akron, Ohio

[21] Appl. No.: 835,161

[22] Filed: Feb. 13, 1992

[51] Int. Cl.$^5$ ............................................. F16D 65/54
[52] U.S. Cl. ............................... 188/71.8; 188/196 R; 188/196 P; 192/111 A
[58] Field of Search ............. 188/71.8, 196 R, 196 P; 192/111 A

[56] References Cited

U.S. PATENT DOCUMENTS

| | | |
|---|---|---|
| 3,580,365 | 5/1971 | Bialkowski . |
| 3,589,479 | 6/1971 | Plaat . |
| 4,180,147 | 12/1979 | Tjarksen et al. . |
| 4,503,950 | 3/1985 | Anderson .................... 188/196 R |
| 4,815,359 | 3/1989 | Black .................... 188/196 P X |

Primary Examiner—George E. A. Halvosa
Attorney, Agent, or Firm—David M. Ronyak; Joseph Januszkiewicz

[57] ABSTRACT

An actuator mechanism for a braking system employing multiple disc brakes to insure an air gap between the pressure plate of the brake stack and the piston head of a piston. The piston is mounted in a cylindrical housing with an end wall to which a rod is secured. The rod extends into the piston and has a hardened ball on its end for engagement by a deformable sleeve. The deformable sleeve is connected to an outer cylindrical tube for movement therewith. Such outer tube has a flange on one end that slidably engages the cylindrical wall of the piston and a ring on the other end that is adapted to engage an annular spring retainer member slidably mounted on the outer tube. The piston has an inwardly extending annular abutment that engages the retainer member with a coil spring encircling the outer tube having one end engaging the flange and the other end engaging the retainer member to provide widely spaced footprints for the spring. Such spring biases the piston after a braking action to re-establish the air gap.

6 Claims, 3 Drawing Sheets 5,219,046

AIRCRAFT BRAKE

BACKGROUND OF THE INVENTION

This invention relates to a friction aircraft braking system and more particularly to a new and improved automatic brake adjuster for use in multiple actuator for an aircraft wheel and brake assembly.

During the braking of an aircraft, a plurality of alternately splined stator and rotor discs are brought into sliding frictional engagement with each other to define a brake stack which generates considerable heat within the braking elements and the supporting structure. The stator and rotor discs, which can be made of metal or carbon, can withstand the high heat build-up in such brakes, however, in the case of the brake actuating mechanism and the associated brake adjuster, which are much more heat sensitive, it is important to minimize their direct contact with the brake stack except for the time that actuation occurs. In this regard it is important to provide within the brake adjuster a mechanism to insure retraction of the brake actuating mechanism after each release regardless of the compensations that occur after the repeated brake applications.

The present invention recognizes the need to enhance performance under repeated application and use of the aircraft brake adjuster/retractor components because wear and degration occurs within the components. Most brake adjuster/retractor mechanisms use helical coil springs to retract the actuation system, introducing high loads which inherently produce a high side load component. This side load, is normally reacted by other components in the adjuster assembly and can cause wear on the dynamic surfaces which can degrade the surface conditions of the components and in some cases cause a premature brake removal from service. The present invention provides a new and improved aircraft brake adjuster/retractor mechanism by providing spaced reaction surfaces to minimize the effect of side loading.

SUMMARY OF THE INVENTION

The present invention contemplates a brake actuator mechanism for use in a multiple-disc brake system with an automatic brake adjuster to insure an air gap between the pressure plate and the piston head of a piston. The piston is slidably mounted in the bore of a cylindrical housing with a pressure source operative to move the piston linearly within the cylindrical housing and position the piston head against the pressure plate and a brake stack to effect a brake application. The movable piston has a radially inwardly extending abutment that abuttingly engages a spring retainer member to insure a wide footprint for the transfer of side loadings. A spring is retained between the retainer member and a flanged portion of a first tube member that bias the piston rearwardly to establish the air gap. The first tube is connected to one end of a rod via a deformable tube wherein the rod has its other end connected to the cylindrical housing.

DETAILED DESCRIPTION

Figure 1:
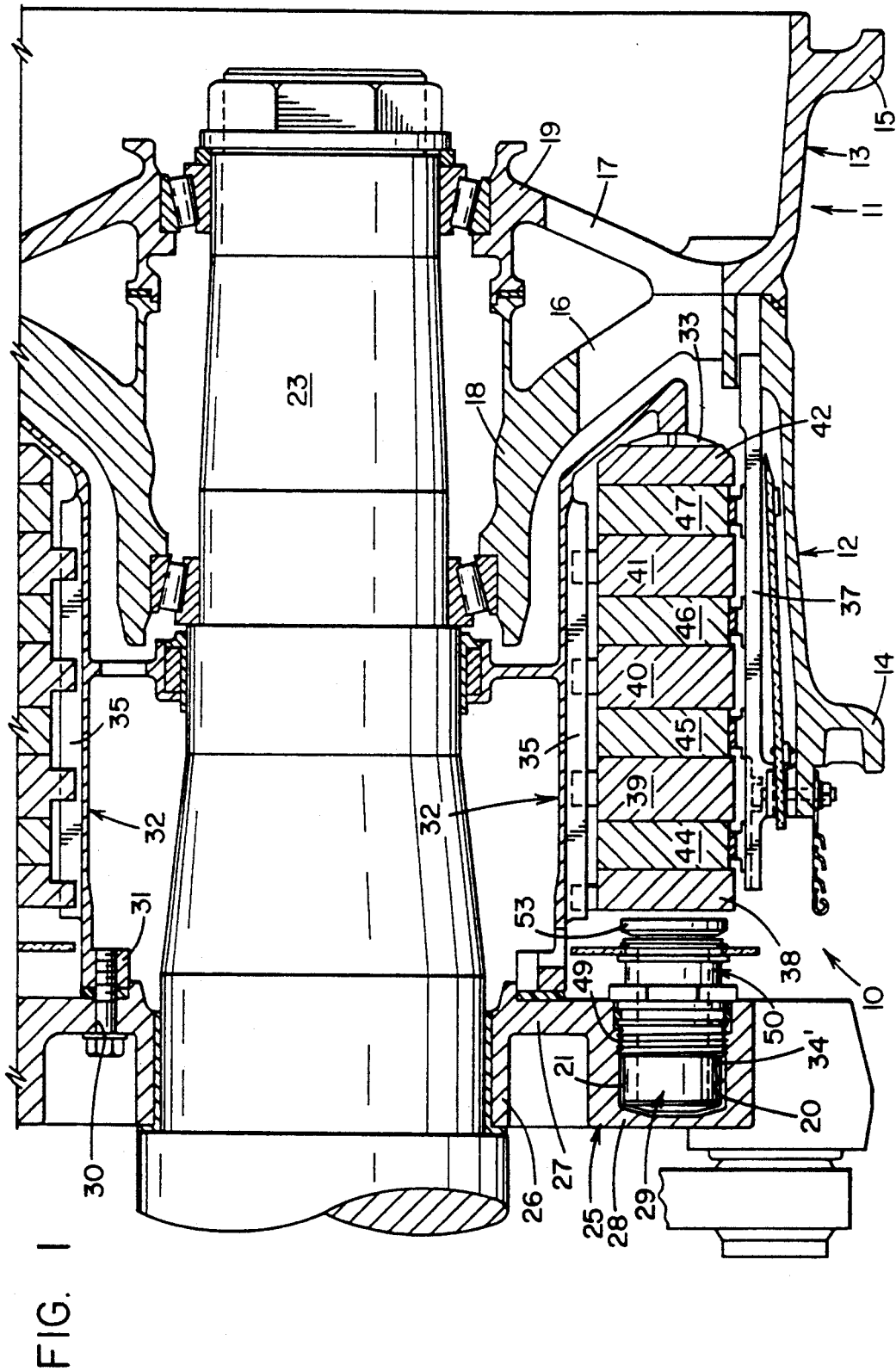
FIG. 1 is a schematic cross-sectional view of an aircraft wheel and brake assembly showing a piston-housing with brake adjuster/reactor mechanism.

Referring to the drawings, wherein like reference numerals designate like or corresponding parts throughout the several views, there is shown in FIG. 1 a friction brake mechanism 10 for use with a cylindrical wheel 11 having matching annular wheel sections 12 and 13. Each of the wheel sections 12 and 13 has a tire flange or rim member 14 and 15, web member 16 and 17, and hub members 18 and 19. The wheel sections 12 and 13 are fastened together by suitable bolts disposed in aligned bores within web members 16 and 17 to form an integral unit herewith.

The hub members 18 and 19 are supported for rotation on suitable bearings, which are mounted on a non-rotatable axle member or axle means 23 having a central axis. Mounted on axle member 23 is a carrier 25, which carrier 25 has an inner hub or rim portion 26, a radially extending flange portion 27 and a plurality of circumferential cylinders or cylinder housings 28. Such carrier 25 is also referred to as a piston housing or a piston support member. Flange 27 of the carrier 25 has a plurality of circumferentially spaced bores 30 for securing such flange to an annular hub 31 of a cylindrical torque tube member or torque tube 32, which torque tube member 32 has an annular and radially outwardly extending reaction plate or reaction member 33. The reaction plate 33 may be made integral with the torque tube member 32 or may be made as a separate annular piece and suitably connected to the torque tube or torque tube member 32.

Torque tube 32 has a plurality of circumferentially spaced splines or spline members 35 which are axially extending. Wheel section 12 has a plurality of circumferentially spaced ribs 37 adjacent to its inner peripheral surface, which are secured thereto to provide an integral type rib for the brake assembly.

Spline members or splines 35 support an axially non-rotatable pressure plate or end disc 38 and inner nonrotatable discs or stator discs 39, 40, and 41. All of such discs 38, 39, 40 and 41 have slotted openings at circumferentially spaced locations on their inner periphery for captive engagement by the spline members 35 as is old and well known in the art. Such discs 38, 39, 40, and 41 constitute the stators for friction brake 10. An annular disc or annular braking element 42 is suitably connected to the reaction plate 33 and acts in concert with the stator discs 38, 39, 40 and 41.

A plurality of axially spaced discs 44, 45, 46 and 47 interspaced or interleaved between the stator discs 38 through 42, have a plurality of circumferentially spaced openings along their outer periphery for engagement by the corresponding ribs 37 as is old and well known in the art thereby forming the rotor discs for the friction brake 10. All of the stator discs 38 through 42 and rotor discs (44 through 47) may be made from a suitable brake material such as metal, steel, carbon or other wear-resistant material for withstanding high temperatures and providing a heat sink. The number of discs may be varied as is necessary for the application involved. The respective stator discs and rotor discs that have the circumferentially spaced openings on the inner and outer periphery may accommodate reinforcing inserts to provide reinforcement to the walls of such slotted openings and to enhance the life of such slots. Such reinforcing inserts are also referred to as drive clips.

Figure 2:
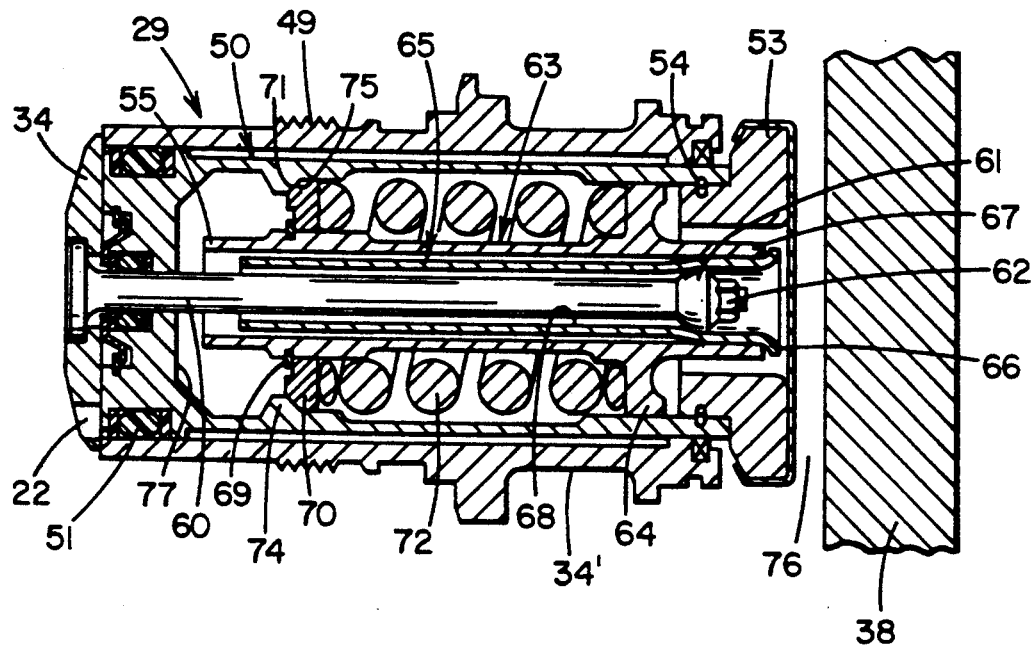
FIG. 2 is an enlarged cross-sectional view of a piston assembly with brake adjuster/retractor mechanism.
Figure 3:
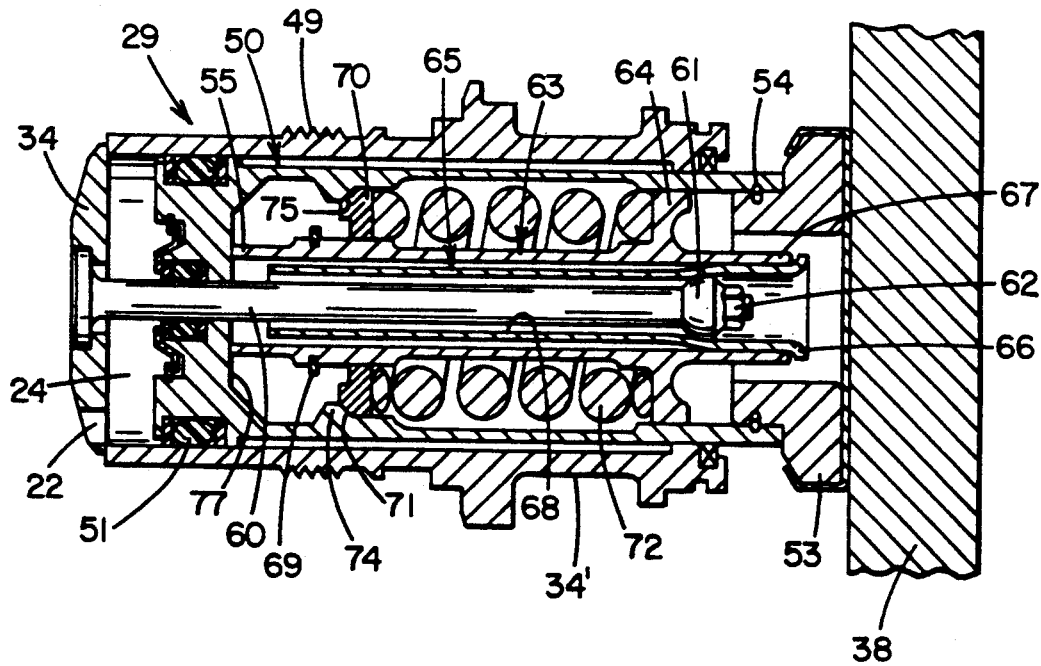
FIG. 3 is a cross-sectional view of a piston assembly with brake adjuster/retractor mechanism under a brake application condition where there has been some wear.

The actuating mechanism for the brake includes the carrier or piston housing 25 which contains the circumferentially spaced cylinder housings 28, which as shown in FIG. 1 is integral with the flange 27 and rim portion or hub 26. As seen in FIG. I, cylinder housing 28 has a bore 20 which receives a piston cylinder 29 which as shown in FIGS. 2 and 3 is threaded on its outer surface as at 49 for convenience of assembling into the cylindrical housing 28 to create a pressure chamber 21 that is suitably connected via conduits to a pressure source. Only one piston cylinder 29 will be described. The cylinder 29 has an end plate or wall 34 and a cylindrical or tubular member 34' with a piston 50 slidably mounted therein. The one outer end of piston 50 is recessed to receive a packing 51 which slidingly engages the interior wall of the tubular member 34'. The end portion of piston 50 cooperates with the interior end wall surface of end wall 34 to define a piston chamber 24 which can be pressurized via bores 22 in the end wall 34 that communicate with the pressure chamber 21 (FIG. 1) and a suitable pressure source to actuate piston 50 for a purpose to be described.

The other end of piston 50 has a piston head 53 suitably connected thereto as by a retainer ring 54. Suitably secured to the end wall 34 of cylinder or piston cylinder 29 is one end of a longitudinally extending rod 60, which rod 60 extends into the interior of piston 50 through a bore in the one outer end portion of piston 50. The other end of rod 60 has a hardened ball 61 secured thereto as by a nut 62. A tubular member or guide spring retainer 63, of cylindrical configuration, has an outwardly projecting rib or flange 64 on one end and overlies rod 60. Positioned between tubular member 63 and rod 60 is a deformable tube 65 having one of its end portions 66 suitably flared for engagement with the one end 67 of tubular member 63. The hardened ball 61 is frictionally received by the interior bore 68 of the deformable tube 65. The other end 55 of tubular member or guide spring retainer 63 has an outer circumferentially extending groove to receive a ring 69. Abutting ring 69 is an annular spring retainer member 70 with an outwardly disposed frusto-conical surface 71. A helical coil spring 72 encompasses the tubular member 63, having one end abutting spring retainer member 70 and having the other end abutting flange 64 of tubular member 63. Thus spring 72 keeps the spring retainer member 70 biased against ring 69 which is fixed in tubular member 63. The interior wall surface of piston 50 has a flanged portion 74 with a conical tapered surface 75 that is frusto-conical in configuration as depicted by FIG. 2 and 3 that is in abutting contact with the frusto-conical surface 71 of retainer member 70.

Figures 4, 5:
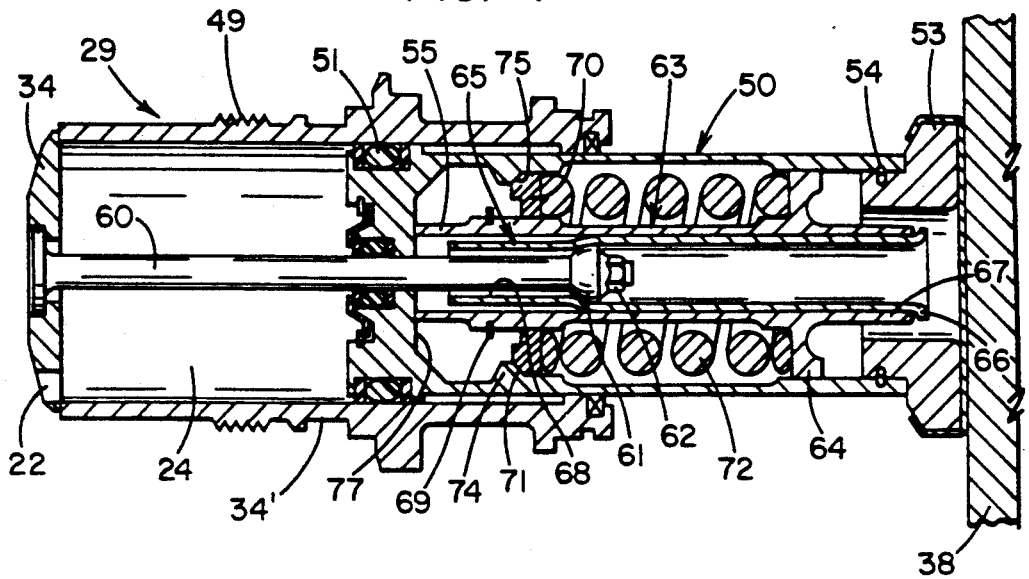
FIG. 4 is a cross-sectional view of a piston assembly with brake adjuster/retractor mechanism similar to that shown in FIG. 3 but with the piston head extended axially outwardly a greater distance to illustrate wear and take up within the brake adjuster due to brake disc wear.
FIG. 5 is a cross-sectional view of a piston assembly with a modification of the brake adjuster/retractor mechanism.

In the normal non-actuated condition of the brake assembly, the piston 50 is in a withdrawn condition as illustrated in FIGS. I and 2 with an air gap 76 existing between the pressure plate 38 and piston head 53. To effect an actuation of the brakes, the pilot of the aircraft actuates suitable controls which directs pressurized fluids via a suitable conduit to pressure chamber 21 and piston chamber 24. When the piston 50 has moved a distance equal to the air gap 76, the flanged portion 74 of piston 50 will compress spring 72 slightly via movement of spring retainer member 70. The forwardly disposed wall portion 77 of piston 50 will abut the other end 55 of tubular member 63. Further pressurization of chamber 21 and piston chamber 24 will move the piston 50, piston head 53 along with tubular member 63 and deformable tube 65 therewith towards the pressure plate 38 to intergage and compress the rotor and stator discs between the pressure plate 38 and the reaction plate 33 to effect a braking action. Upon release of the pressurized fluids in chamber 21 and piston chamber 24, coil spring 72 acts on spring retainer member 70 to return the piston 50 via the interconnection of retainer member 70 and flanged portion 74 of piston 50 to a position as illustrated in FIG. 2 where the initial air gap 76 is reestablished. After repeated applications of the piston 50 and its related parts on the pressure plate 38 and the other interleaved brake discs, the brake discs will wear and then require that the piston 50 and the piston head 53 to travel further to apply the brake discs against each other and against the reaction plate 33. To compensate for this wear, the piston and piston head 53 in FIG. 2 shows the ball 61 on rod 60 as substantially adjacent to the piston head 53 while FIG. 3 shows the ball 61 as having traveled a sufficient distance within the deformable tube 65 which allows the piston 50 to move outwardly on rod 60 a sufficient distance to compensate for the wear of the stator and rotor discs. Further wear of the brake discs would allow the piston and the piston head 53 to move a little farther than that shown in FIG. 3 wherein the hardened ball 61 would deform tube 65 slightly more than that shown, which action allows tubular member 63 and its accompanying deformable sleeve 65 to move rightward as seen in FIG. 3. FIG. 4 illustrates the condition of considerable wear. This action of the deformable sleeve 65 along with ball 61 within the piston is a wear adjuster means. During this action the respective mating frusto-conical surfaces 71 and 75 of the spring retainer member 70 and the flanged portion 74 of piston 70 interact from the force of the helical coil spring to cooperate with the flanged portion 64 so that the side load does not cause misalignment and wear on any surrounding components particularly on the rod 60. The spring as captured between the flange 64 of tubular member 63 and the retainer 70 is unique in that the side load is reacted by the widely spaced footprint or reaction surfaces of the frusto-conical surfaces 71 and 75 and the flange 64 so that the resulting sideward forces from the loaded spring are as small as possible. The reduced side forces decrease the amount of wear on the surrounding components and the spring as located eliminates sideward forces on the other components such as the rod 60 eliminating wear thereon and degradation particularly where the piston must travel an excessive distance due to considerable brake wear.

A modification of the invention of FIG. 2 is shown in FIG. 5 wherein like parts are numbered alike. There is shown in FIG. 5 piston cylinder 29' having an end wall 34 and a cylindrical or tubular member 34' with piston 50 slidably mounted therein. The one outer end of piston 50 is recessed to receive packing 51. The end portion of the piston 50 cooperates with the end wall surface of end wall 34 to define a piston chamber as in the first embodiment, which upon pressurization actuates the piston 50. Such piston 50 has piston head 53, retainer ring 54, rod 60, hardened ball 61 and deformable tube 65 as in the first described embodiment. A spring capsule 80 is employed in this embodiment having a generally cylindrical body 81 which has slots therein to lighten the weight of such body. The one end of cylindrical body 81 has an inwardly extending flanged portion 82 and a cylindrical portion 83 which portion 83 is suitably connected to the deformable tube 65 as by a collar 79 on tube 65. The other end 84 of cylindrical body 81 has an annular recess to receive a ring 86 which engages a flanged portion 87 of a tubular member 88 whose end portion is in abutting contact with the wall portion 77 of piston 50. The flanged portion 87 of tubular member 88 is captively engaged by spring 72 (as disclosed in the prior embodiment) and ring 86. In this instance the tubular member 88 provides a wide footprint for the spring 72 in cooperation with the flanged portion 82 so that the side loading does not cause misalignment and wear on the surrounding components particularly the central pin or rod 60. This embodiment operates to adjust for wear of the brake stack in the same manner as the first described embodiment.

It will be apparent that although a specific embodiment and a certain modification of the invention has been described in detail, the invention is not limited to the specifically illustrated and described construction since variations may be made without departing from the principles of the invention.

I claim:

1. In a brake system having a plurality of friction discs located between a pressure plate and a reaction plate; an actuating mechanism operative for moving said pressure plate toward said friction discs and said reaction plate; said actuating mechanism having at least one cylindrical housing with an end wall and a cylindrical member defining a bore therein; a piston means slidably mounted in said bore; said piston means having an elongated cylindrical body with one end being a closed portion adjacent said end wall; said cylindrical body adjacent to said closed end portion having an annular abutment extending radially inwardly; said annular abutment having a frusto-conical surface; said end wall and said one end of said piston means are cooperative to define a chamber for connection to a source of pressurized fluid; said piston means having a second end connected to a piston head for engagement with said pressure plate; a rod having one end secured to said end wall and extending through said closed end of said piston means into said bore; said rod having a ball secured onto the other end of said rod; a first tube having a first end portion, a second end portion and a flange adjacent said second end portion; said flanged portion having a peripheral annular surface that slidably engages the interior surface of said elongated cylindrical body; an annular spring retainer member slidably mounted on said first tube adjacent to said one end; said retainer member having a frusto-conical surface abuttingly engaging said frusto-conical surface of said annular abutment on said elongated cylindrical body; a ring secured to said first tube between said spring retainer member and said first end portion to limit the movement of said retainer member toward said one end portion; a second tube mounted between said rod and said first tube and concentric to said first tube; said second tube being deformable; said second tube having a first flared end portion operative to frictionally interconnect said second tube to said second end portion of said first tube; said second tube having a first diameter section, a second diameter section, and a tapered section interconnecting said first diameter section to said second diameter section and frictionally engaging said ball on said rod to interconnect said rod to said first and said second tubes to establish the size of said chamber and to establish an air gap between said piston head and said pressure plate upon termination of the application of fluid pressure to said chamber; said second diameter is less in dimension than the diameter of said first diameter section; and a spring concentrically positioned on said first tube having one end engaging said retainer member and the other end engaging said flange on said first tube to bias said retainer member into contact with said ring and to bias said frusto-conical surface of said retainer member into contact with said frusto-conical surface of said annular abutment on said piston means to provide widely spaced footprints to eliminate misalignment.

2. In a brake system as set forth in claim 1 wherein said first end portion of said first tube is spaced from said one end wall of said piston when said pressure chamber is in a non-pressurized condition.

3. In a brake system having a plurality of friction discs located between a pressure plate and a reaction plate; an actuating mechanism operative for moving said pressure plate toward said friction discs and said reaction plate; said actuating mechanism having at least one cylindrical housing with an end wall and a cylindrical member defining a bore therein; a piston means slidably mounted in said bore; said piston means having an elongated cylindrical body; said end wall and one end of said piston means are cooperative to define a pressure chamber for connection to a source of pressurized fluid; said piston means having a second end connected to a piston head for engagement with said pressure plate; a rod having one end secured to said end wall and extending through said piston means into said bore; said rod having a ball secured into the other end of said rod; a first tube having a first end portion and a second end portion with a radially inwardly extending portion; said first end portion and said second end portion having exterior annular surfaces for slidably engaging the interior surface of said elongated cylindrical body; a tubular member slidably mounted within said first tube adjacent to said one end; a ring secured to said first end portion of said first tube to limit the movement of said tubular member toward said one end portion; a deformable tube mounted between said rod and said first tube and concentric to said first tube; said deformable tube having a first flared end portion operative to connect and secure said rod to said radially inwardly extending portion of said first tube to establish the size of said chamber and to establish an air gap between said piston head and said pressure plate upon termination of the application of fluid pressure to said chamber; and a spring concentrically positioned within said first tube having one end engaging said inwardly extending portion of said first tube and the other end engaging said tubular member to bias said tubular member towards and into contact with said ring.

4. In a brake system as set forth in claim 3 wherein said tubular member is spaced radially outwardly from said pin and said deformable tube.

5. In a brake system having a plurality of friction brake discs located between a pressure plate and a backing plate, an actuator mechanism for moving the pressure plate toward the backing plate, said actuator mechanism having a least one cylindrical housing with a bore therein, said cylindrical housing having a rearwardly disposed wall, a piston with a rearwardly disposed disc and an elongated sleeve integral therewith extending therefrom, said rearwardly disposed disc and said rearwardly disposed wall of said housing operative to define a pressure chamber, said sleeve having a forwardly disposed end portion and a rearwardly disposed end portion, a piston head secured to said forwardly disposed end portion of said sleeve, a rod having one end secured to the rearwardly disposed wall, said rod having secured to the other end a hardened ball, a deformable tube having one end frictionally engaged by said ball, an elongated tube member having one end abutting and frictionally engaging a flared portion of said deformable tube, , said deformable tube being concentric with said tube member, said tube member having an annular outwardly extending abutment adjacent to said one end of said tube member and slidably engaging the interior surface of said sleeve of said piston, a ring mounted on the other end of said tube member, an annular retainer member slidably mounted on said other end of said tube member, said retainer member having a frusto-conical shoulder, said ring mounted on said other end of said tube member to limit the movement of said annular retainer member towards said other end of said tube member, said sleeve having an annular shoulder on its inner periphery on said rearwardly disposed end portion with a frusto-conical shoulder for engagement with said frusto-conical shoulder on said annular retainer member, and a helical spring mounted around said tube member having one end seating on said annular abutment of said tube member and having the other end biasing said retainer member into engagement with said annular shoulder on said sleeve to bias said piston away from said pressure plate to establish a gap between said pressure plate and said piston head while maintaining widely spaced footprints on said spring to prevent cocking thereof.

6. In a brake system as set forth in claim 5 wherein the other end of said deformable tube and said other end of said tube member are spaced from said rearwardly disposed disc of said piston in the non pressurized condition of said pressure chamber, and said deformable tube upon further deformation by said ball provides a further frictional engagement between said deformable tube and said elongated tube member.

* * * * *